US 11,683,750 B2

United States Patent
Niu et al.

(10) Patent No.: US 11,683,750 B2
(45) Date of Patent: Jun. 20, 2023

(54) SYSTEMS AND METHODS FOR BASE STATION SELECTION IN LICENSED AND UNLICENSED SPECTRUMS

(71) Applicant: ZTE CORPORATION, Guangdong (CN)

(72) Inventors: Li Niu, Shenzhen (CN); Yajun Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/039,052

(22) Filed: Sep. 30, 2020

(65) Prior Publication Data

US 2021/0084583 A1    Mar. 18, 2021

Related U.S. Application Data

(63) Continuation of application No. PCT/CN2018/082018, filed on Apr. 4, 2018.

(51) Int. Cl.
*H04B 17/318* (2015.01)
*H04W 16/14* (2009.01)
*H04W 48/20* (2009.01)

(52) U.S. Cl.
CPC .......... *H04W 48/20* (2013.01); *H04B 17/318* (2015.01); *H04W 16/14* (2013.01)

(58) Field of Classification Search
CPC ..... H04W 48/20; H04W 16/14; H04B 17/318
USPC ...................................................... 455/426
See application file for complete search history.

(56) References Cited

U.S. PATENT DOCUMENTS

| | | | | |
|---|---|---|---|---|
| 2007/0004445 | A1* | 1/2007 | Dorsey | H04W 36/30 455/525 |
| 2010/0330943 | A1* | 12/2010 | Hoepfner | H04B 17/318 455/226.2 |
| 2016/0302230 | A1 | 10/2016 | Novlan et al. | |
| 2017/0222746 | A1* | 8/2017 | Kang | H04W 72/0453 |
| 2017/0238330 | A1* | 8/2017 | Jiang | H04W 72/0453 370/329 |
| 2019/0141696 | A1* | 5/2019 | Kim | H04W 72/0413 |
| 2019/0149252 | A1* | 5/2019 | Siomina | H04B 17/309 370/252 |
| 2019/0364469 | A1* | 11/2019 | Siomina | H04W 72/0453 |

FOREIGN PATENT DOCUMENTS

| | | |
|---|---|---|
| CN | 106559826 A | 4/2017 |
| CN | 106559830 A | 4/2017 |
| CN | 107078887 A | 8/2017 |

(Continued)

OTHER PUBLICATIONS

International Search Report and Written Opinion for PCT Appl. No. PCT/CN2018/082018 dated Jan. 4, 2019 (7 pages).

*Primary Examiner* — Ted M Wang
(74) *Attorney, Agent, or Firm* — Foley & Lardner LLP (57) ABSTRACT

A system and method for base station selection in licensed and unlicensed spectrums are disclosed herein. In one embodiment, a method performed by a communication device includes: receiving reference signals, wherein the reference signals are from a licensed spectrum or an unlicensed spectrum; determining a parameter value, based on the reference signals, associated with least one of a received signal strength indicator (RSSI) and a channel occupancy; and selecting a communication node in response to the parameter value meeting a condition.

18 Claims, 2 Drawing Sheets

(56) References Cited

FOREIGN PATENT DOCUMENTS

| | | |
|---|---|---|
| CN | 107873138 A | 4/2018 |
| WO | WO-2016/024908 A1 | 2/2016 |
| WO | WO-2016/053178 A1 | 4/2016 |

\* cited by examiner

SYSTEMS AND METHODS FOR BASE STATION SELECTION IN LICENSED AND UNLICENSED SPECTRUMS

CROSS-REFERENCE TO RELATED APPLICATIONS

This application claims the benefit of priority under 35 U.S.C. § 120 as a continuation of PCT Patent Application No. PCT/CN2018/082018, filed on Apr. 4, 2018, the disclosure of which is incorporated herein by reference in its entirety.

TECHNICAL FIELD

This disclosure relates generally to wireless communications and, more particularly, to systems and methods for base station selection in licensed and unlicensed spectrums.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today. Already, the utilization of the licensed radio spectrum, or spectrum for short, is close to a saturation point. Also, use of the licensed spectrum may come with a licensing cost for operators. Accordingly, operators may look to the unlicensed spectrum to augment their service offering and solutions. For some regions with private network deployments, efficient use of the unlicensed spectrum with wider bandwidth (e.g., 80 or 100 MHz), may reduce implementation complexity for both networks and terminals (e.g., user equipment or UE), compared to carriers of smaller bandwidth, when moving to address larger amounts of spectrum. This may be considered as inevitable for scenarios where multi-Gbps data rates are to be achieved.

The unlicensed spectrum may be used as a complementary tool with the licensed spectrum. For example, Licensed-Assisted Access (LAA) may refer to access to an unlicensed spectrum via a Secondary Component Carrier (SCell) when assisted by a Primary Component Carrier (Pcell) on licensed spectrum using the Carrier Aggregation Framework. But for LAA, the unlicensed spectrum may still be tied to the licensed spectrum and/or co-located. This may place limitations on the deployment and flexible usage of the unlicensed spectrum. It may be desirable for private networks to have flexible deployment and independent operation. Accordingly, operators of private networks may consider utilizing an unlicensed spectrum as a standalone operation.

Within the unlicensed spectrum, base stations (BS) (e.g., nodes) and UEs (e.g., terminals) may engage in a "Listen Before Talk" (LBT) process so that communications within the unlicensed spectrum will not interfere with each other. Also, a UE may assess BS suitability prior to selecting a suitable BS with cellular coverage for the UE. However, typical methods of assessing BS suitability, such as assessments of a Reference Signal Received Power (RSRP) and Reference Signal Received Quality (RSRQ), may evaluate signal quality but may not consider or evaluate other parameters, such as a probability of preemption or a level of interference within the unlicensed spectrum. Therefore, traditional techniques for assessing BS suitability for a UE may not be entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication device includes: receiving reference signals, wherein the reference signals are from a licensed spectrum and/or an unlicensed spectrum; determining a parameter value, based on the reference signals, associated with least one of a received signal strength indicator (RSSI) and a channel occupancy; and selecting a communication node in response to the parameter value meeting a condition.

In a further embodiment, a communication device includes: a receiver configured to: receive reference signals from a licensed spectrum and/or an unlicensed spectrum; at least one processor configured to: determine a parameter value, based on the reference signals, associated with least one of a received signal strength indicator (RSSI) and a channel occupancy; and a transmitter configured to: select a communication node in response to the parameter value meeting a condition.

In yet another embodiment, a non-transitory computer readable medium having instructions stored thereon, wherein the instructions, when executed by a processor, cause a device to perform operations including: receiving reference signals, wherein the reference signals are from both a licensed spectrum and an unlicensed spectrum; determining a parameter value, based on the reference signals, associated with least one of a received signal strength indicator (RSSI) and a channel occupancy; and selecting a communication node in response to the parameter value meeting a condition.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
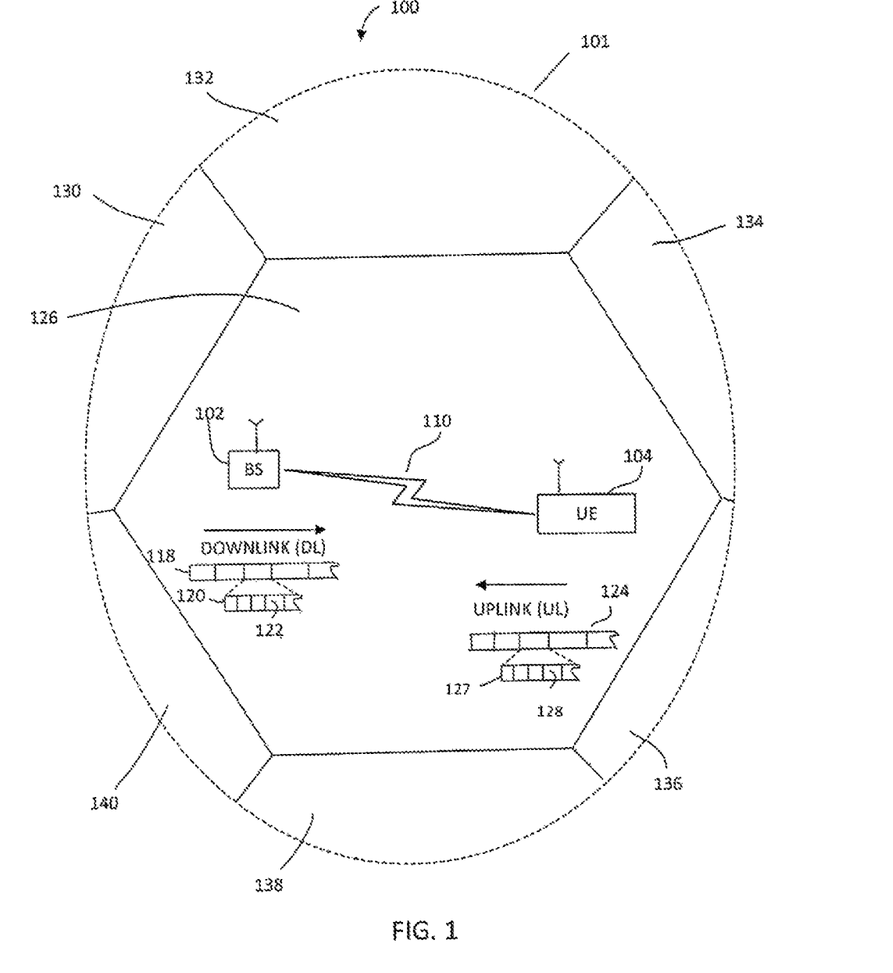
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. Such an exemplary network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. A UE 104 may undergo a random access procedure to join the network 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users. Accordingly, reference to a cell may be a short hand reference to a BS with an associated coverage region or area. In certain embodiments, a cell may be interchangeably referred to as a BS and be referred to as "a cell or a BS", or "a BS or a cell.

For example, the BS 102 may operate at an allocated channel transmission bandwidth (e.g., spectrum) to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention. In certain embodiments, a communication device may refer more specifically to a UE and a communication node may refer more specifically to a BS in relation to the UE.

Figure 2:
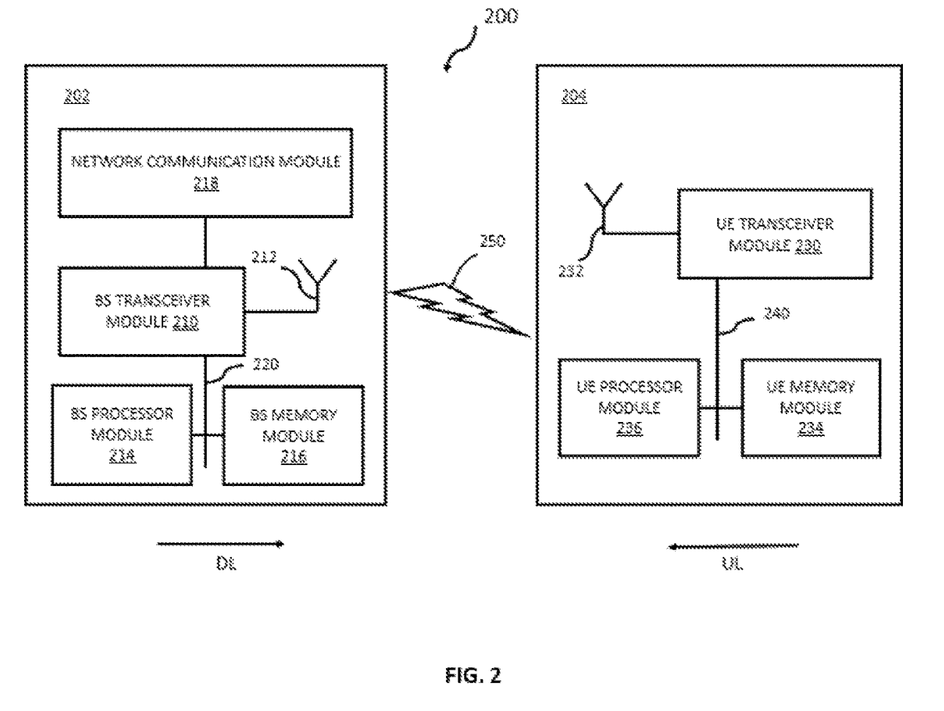
FIG. 2 illustrates block diagrams of an exemplary base station (BS) and a user equipment (UE) device, in accordance with some embodiments of the present disclosure.

FIG. 2 illustrates a block diagram of an exemplary wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage and/or computer-readable medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

Figure 3:
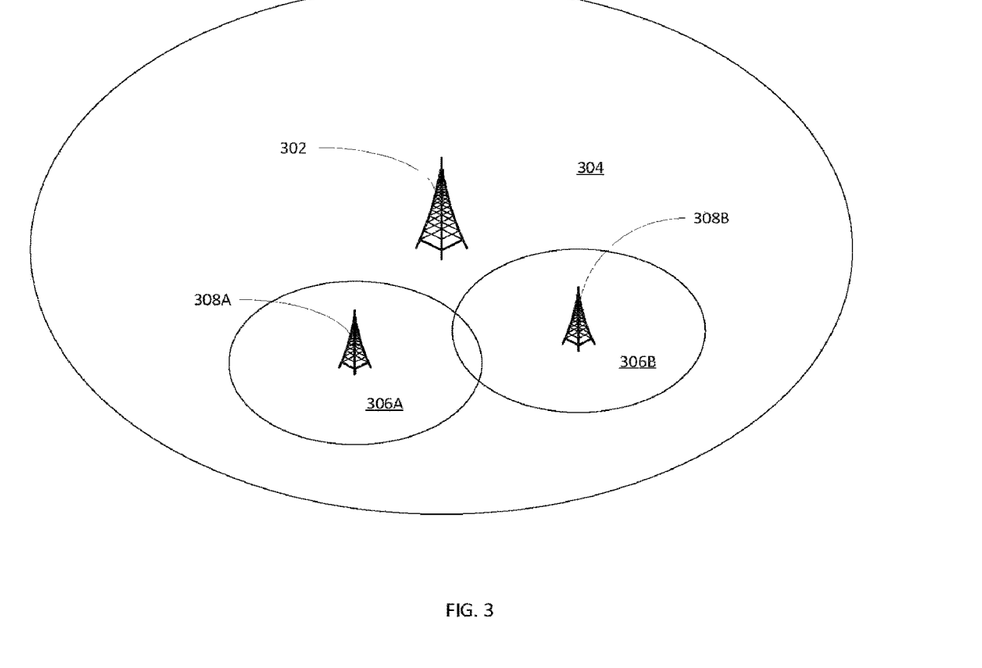
FIG. 3 illustrates a deployment of a licensed spectrum and an unlicensed spectrum over an area, in accordance with some embodiments of the present disclosure.

FIG. 3 illustrates a deployment of a licensed spectrum and an unlicensed spectrum over an area, in accordance with some embodiments of the present disclosure. A first BS 302 may provide a licensed spectrum for access by a UE along a licensed spectrum coverage area 304. Stated another way, the first BS 302 may operate within the licensed spectrum over the licensed spectrum coverage area 304 and be referred to also as a first cell. The licensed spectrum coverage area 304 may also cover a first unlicensed spectrum coverage area 306A and a second unlicensed spectrum coverage area 306B. The first unlicensed spectrum coverage area 306A may be provided by a second BS 308A that operates within the unlicensed spectrum. Also, the second unlicensed spectrum coverage area 306B may be provided by a third BS 308B that operates within the unlicensed spectrum. The second BS 308A, along with the unlicensed spectrum coverage area 306A, may be referred to as a second cell. Also, the third BS 308B, along with the unlicensed spectrum coverage area 306B, may be referred to as a third cell. The first unlicensed spectrum coverage area 306A and the second unlicensed spectrum coverage area 306B may overlap in an area 310. Although the licensed spectrum coverage area 304 is illustrated as extending over and beyond the unlicensed spectrum coverage areas 306A and 306B, an unlicensed spectrum coverage area may extend over and beyond a licensed spectrum coverage area, as desired for different applications in various embodiments. Either the licensed or the unlicensed spectrum may provide services to a UE within an associated licensed or unlicensed spectrum coverage area.

BSes may engage in a "Listen Before Talk" (LBT) process so that communications within the unlicensed spectrum may have an appropriate level of signal quality and acceptable preemption probability and interference levels. Performance of the LBT process may reduce the chance of interference among the various devices communicating within the unlicensed band, as communications within the unlicensed spectrum may be less organized than communication within the licensed spectrum. Also, a UE seeking to operate within the unlicensed spectrum may select a suitable BS with cellular coverage for the UE. However, as noted above typical methods of assessing base station suitability, such as the Reference Signal Received Power (RSRP) and Reference Signal Received Quality (RSRQ), may evaluate signal quality but may not consider or evaluate a probability of preemption or a level of interference within the unlicensed spectrum.

Accordingly, the present disclosure provides various embodiments of systems and methods for base station (BS) selection by a user equipment (UE) in an unlicensed and/or licensed spectrum. In certain embodiments, base station suitability assessments may utilize a Received Signal Strength Indicator (RSSI) and a channel occupancy parameter to evaluate a probability of preemption or a level of interference within the unlicensed spectrum. The RSSI may refer to a Received Signal Strength Indicator that comprises a linear average of total received power, in watts, observed in certain OFDM symbols of measurement subframes, including co-channel serving and non-serving cells, adjacent channel interference, thermal noise etc. The channel occupancy parameter may refer to a channel occupancy as a rounded percentage of sample values which are beyond a channel occupancy threshold within all sample values.

The RSSI may be utilized to determine how often the UE is expected to be interfered by hidden BSes or other UEs and, if so, how strong the interference would be in the downlink. Also, the channel occupancy parameter may be utilized to assess how often the UE may expected to be able to access a particular channel in an uplink.

In a first exemplary embodiment, a UE may be in an idle or inactive state (e.g., RRC_IDLE or RRC_inactive). In the idle or inactive state, the UE may measure RSSI and channel occupancy per frequency from reference signals received from a BS. Also, a RSSI measurement timing configuration (RMTC) may be broadcast in system information from the BS. For example, the RMTC may be broadcast as part of system information. The system information may encompass both intra-frequency and inter-frequency information, including a period, subframeoffset (e.g., start time), meas-duration (e.g., a duration of time within which a UE may perform measurements). The UE may measure the RSSI and channel occupancy per frequency according to the RMTC.

In a second exemplary embodiment, a cell selection criterion S may be utilized in base station suitability assessment. Stated another way, a BS may be deemed suitable (e.g., a UE may select the BS for communication) in response to the cell selection criterion S (e.g., parameter value relationship(s) or condition(s)) being met or satisfied. In an idle or inactive state (e.g., RRC_IDLE or RRC_inactive), a UE may select a cell (e.g., select a BS) based on a cell section procedure that incorporates a base station suitability assessment. Once the UE has found a suitable BS (e.g., cell) that fulfills the cell selection criterion S, the UE may then select the suitable BS and camp on the associated cell (e.g., BS with associated coverage area or region). An appropriate cell selection criterion S may be utilized to ensure that the BS can receive good service through accessing a BS, or cell. In certain embodiments, RSRP and RSRQ may be utilized to determine a cell selection criterion S. In various embodiments, the cell selection criterion S is fulfilled when the following relationships are satisfied: Srxlev>0 AND Squal>0, where Srxlev=$Q_{rxlevmeas}$-($Q_{rxlevmin}$+$Q_{rxlevminoffset}$)-$P_{compensation}$-Qoffset$_{temp}$ and Squal=$Q_{qualmeas}$-($Q_{qualmin}$+$Q_{qualminoffset}$). Srxlev is a cell selection receiver (RX) level value (dB). Squal is cell selection quality value (dB). Qoffset$_{temp}$ is an offset temporarily applied to a cell (dB). $Q_{rxlevmeas}$ is a measured cell RX level value (e.g., RSRP). RSRP is the linear average over the power contributions (in [W]) of resource elements that carry reference signals. $Q_{qualmeas}$ is a measured cell quality value (RSRQ). RSRQ is a ratio N×RSRP/(carrier RSSI), where N is the number of resource blocks' (RB) of the RSSI measurement bandwidth; $Q_{rxlevmin}$ is a minimum required RX level in the cell (dBm). $Q_{qualmin}$ is a minimum required quality level in the cell (dB). $Q_{rxlevminoffset}$ is an offset to the signaled Qrxlevmin taken into account in the Srxlev evaluation as a result of a periodic search for a higher priority public land mobile network (PLMN) while camped normally in a visited public land mobile network (VPLMN). $Q_{qualminoffset}$ is an offset to the signaled $Q_{qualmin}$ taken into account in the Squal evaluation as a result of a periodic search for a higher priority PLMN while camped normally in a VPLMN. $P_{EMAX1}$ or $P_{EMAX2}$, is a maximum transmission (TX) power level an UE may use when transmitting on the uplink in the cell (dBm) and may be obtained from the p-Max and the NS-PmaxList respectively in system information block (SIB) type 1, SIB3 and SIB5. $P_{PowerClass}$ is a maximum RF output power of the UE (dBm) according to a UE power class. Also, $P_{compensation}$ is one of the following: if the UE supports the additionalPmax (e.g., a parameter from system information) in the NS-PmaxList (e.g., a list from system information) in SIB1, SIB3 and SIB5, then $P_{compensation}$ is max($P_{EMAX1}$-$P_{PowerClass}$, 0)-(min($P_{EMAX2}$, $P_{PowerClass}$)-min($P_{EMAX1}$, $P_{PowerClass}$)) (dB); otherwise $P_{compensation}$ is max($P_{EMAX1}$-$P_{PowerClass}$, 0) (dB).

However, relative to operation in the licensed spectrum, more devices may be in competition when operating in the unlicensed spectrum. Accordingly, UEs may have fewer service opportunities and more interference when operating in the unlicensed spectrum. As noted above, because RSRQ and RSRP parameters may only measure a successful transmission of a reference signal, these parameters may not reflect a probability of successful LBT operation.

In some embodiments, RSSI can be introduced into the cell selection criterion S. Accordingly, the cell selection criterion S in normal coverage is fulfilled when: Srxlev>0 AND Squal>0 AND Srssi<0, where Srssi=$Q_{rssimeas}$-$Q_{rssimax}$, where Srssi is a cell selection received signal strength indicator, $Q_{rssimeas}$ is a measured signal strength indication in the frequency, and $Q_{rssimax}$ is a maximum signal strength indication in the frequency. Also, $Q_{rssimax}$ can be configured in system information and/or a dedicated RRC message. For example, $Q_{rssimax}$ can be contained in the information relevant for inter-frequency or intra-frequency cell re-selection or idle mode mobility control.

In some embodiments, channel occupancy (e.g., channelOccupancy, or a channel occupancy parameter) can be introduced in the cell selection criterion S. Accordingly, the cell selection criterion S in normal coverage is fulfilled when: Srxlev>0 and Squal>0 AND $S_{channelOccupancy}$<0, where $S_{channelOccupancy}$=$Q_{channelOccupancymeas}$-$Q_{channelOccupancymax}$. Here, $S_{channelOccupancy}$ is a cell selection channel occupancy rate, $Q_{channelOccupancymeas}$ is a measured channel occupancy rate, and $Q_{channelOccupancymax}$ is a maximum channel occupancy rate in the frequency. $Q_{channelOccupancymax}$ can be configured in system information and/or a dedicated RRC message. For example, $Q_{channelOccupancymax}$ can be contained in information relevant for inter-frequency cell re-selection or idle mode mobility control.

In some embodiments, channelOccupancy and RSSI can be introduced into the cell selection criterion S. Accordingly, the cell selection criterion S in normal coverage is fulfilled when: Srxlev>0 and Squal>0 and Srssi<0 AND $S_{channelOccupancy}$<0, where Srssi=$Q_{rssimeas}$-$Q_{rssimax}$ and $S_{channelOccupancy}$=$Q_{channelOccupancymeas}$-$Q_{channelOccupancymax}$.

In some embodiments, channelOccupancy and RSSI can be introduced into the cell selection criterion S. Accordingly, the cell selection criterion S in normal coverage is fulfilled when: Srxlev>0 and Srssi<0 AND $S_{channelOccupancy}$<0, where Srssi=$Q_{rssimeas}$-$Q_{rssimax}$ and $S_{channelOccupancy}$=$Q_{channelOccupancymeas}$-$Q_{channelOccupancymax}$.

In some embodiments, an additional offset can be introduced (e.g., applied) in the cell selection criterion S. Accordingly, the cell selection criterion S in normal coverage is fulfilled when: Srxlev>0 AND Squal>0, where Srxlev=$Q_{rxlevmeas}$−($Q_{rxlevmin}$+$Q_{rxlevminoffset}$)−$P_{compensation}$−$Qoffset_{temp}$−$Qoffset_{unlicensed}$. Here, $Qoffset_{unlicensed}$ is a offset applied to a cell in the unlicensed spectrum. Also, as noted in this embodiment, BSes (e.g., nodes) can raise or reduce the cell selection value according to a successful preemption probability and interference level. The offset can be configured in system information and/or a dedicated RRC message. For example, the offset can be contained in the information relevant for inter-frequency or intra-frequency cell re-selection or idle mode mobility control.

In some embodiments, other types of additional offset can be introduced into the cell selection criterion S. Accordingly, the cell selection criterion S in normal coverage is fulfilled when: Srxlev>0 AND Squal>0, where Squal=$Q_{qualmeas}$−($Q_{qualmin}$+$Q_{qualminoffset}$)−$Qoffset_{temp}$−$Qoffset_{unlicensed}$. Here, $Qoffset_{unlicensed}$ is a offset applied to a cell in the unlicensed spectrum. Also, as noted in this embodiment, BSes (e.g., nodes) can raise or reduce the cell selection threshold (e.g., as a threshold value) according to the successful preemption probability. The offset may be configured in system information and/or a dedicated RRC message. For example, the offset can be contained in the information relevant for inter-frequency or intra-frequency cell re-selection or idle mode mobility control.

In some embodiments, other types of additional offsets can be introduced into the cell selection criterion S. Accordingly, the cell selection criterion S in normal coverage is fulfilled when: Srxlev>0 AND Squal>0, where Srxlev=$Q_{rxlevmeas}$−($Q_{rxlevmin}$+$Q_{rxlevminoffset}$)−$P_{compensation}$−$Qoffset_{temp}$−$Qoffset_{unlicensed1}$, and Squal=$Q_{qualmeas}$−($Q_{qualmin}$+$Q_{qualminoffset}$)−$Qoffset_{temp}$−$Qoffset_{unlincensed2}$. Here, $Qoffset_{unlicensed1}$ is a first offset applied to a cell in the unlicensed spectrum and $Qoffset_{unlicensed2}$ is a second offset applied to a cell in the unlicensed spectrum. $Qoffset_{unlicensed1}$ and $Qoffset_{unlicensed2}$ can be different in certain embodiments or can be the same in other embodiments. BSes (e.g., nodes) can raise or reduce the cell selection threshold (e.g., as a threshold value) according to a successful preemption probability or an associated load. The offset(s) may be configured in system information and/or a dedicated RRC message. For example, the offset(s) can be contained in the information relevant for inter-frequency or intra-frequency cell re-selection or idle mode mobility control.

In a third exemplary embodiment, base station suitability assessments may take inter-frequency measurement criteria into consideration. A UE may continue to reselect a suitable cell while the UE is in an idle or inactive state. For the licensed spectrum, at first, a UE may evaluate whether to perform inter-frequency measurement. Then, if the UE performs the inter-frequency measurements, the UE may reselect a cell according to the UE's inter-frequency cell reselection criteria.

For the unlicensed spectrum, due to relatively more unreliable communication when compared with the licensed spectrum, it may be desirable to have a UE select a more stable cell when compared with cell selection in the licensed spectrum. Accordingly, the UE may seek out a suitable cell with high cell quality and less load.

In certain embodiments, a deployment scenario may expose the UE to different kinds of spectrum (e.g., the unlicensed and licensed spectrum). Therefore, the UE may perform the intra-frequency cell reselection and inter-frequency cell reselection on the unlicensed spectrum, but also perform the inter-frequency cell reselection on the licensed spectrum. In addition, the reselection priority for the licensed spectrum may be higher than the reselection priority of the unlicensed spectrum. Furthermore, in order to evaluate the load and stability at a communication frequency, a measurement RSSI and channel occupancy can be used.

In some embodiments, a UE may apply the following rules when assessing inter-frequency or inter-radio access technology (RAT) frequency communication on the unlicensed spectrum or the licensed spectrum. These rules may be indicated in system information. Specifically, the rules may instruct a UE to perform measurements (e.g., assessments) on higher priority inter-frequency communications when the UE detects an inter-frequency or inter-RAT frequency communication with a reselection priority higher than the reselection priority of the current frequency communication. These communications may refer to specific cells for communication at particular frequencies to and/or from a BS and/or a UE.

There may also be specific rules for inter-frequency or inter-RAT frequency communications with an equal or lower reselection priority than the reselection priority of the current frequency communication. In certain embodiments, these rules may dictate that a UE may choose not to perform measurements of inter-frequencies communications or inter-RAT frequency communications with cells with equal or lower priority when it detects a serving cell (e.g., BS) that fulfils the following relationship: Srxlev>$S_{nonIntraSearchP}$ and Squal>$S_{nonIntraSearchQ}$ and Srssi<$S_R$ and $S_{channelOccupancy}$<$S_{CO}$, where $S_{nonIntraSearchP}$ specifies the Srxlev threshold (in dB) for E-UTRAN inter-frequency and inter-RAT measurements; and $S_{nonIntraSearchQ}$ specifies the Squal threshold (in dB) for E-UTRAN inter-frequency and inter-RAT measurements. Otherwise, the UE may perform measurements of inter-frequencies or inter-RAT frequency cells with equal or lower priority.

As used herein, $S_R$ may specify the RSSI threshold for inter-frequency and inter-RAT measurements on the unlicensed spectrum. $S_R$ may be configured in system information and/or a dedicated RRC message. For example, $S_R$ can be contained in the information relevant for inter-frequency cell re-selection or idle mode mobility control. Also, $S_{CO}$ may specify the channel occupancy threshold for inter-frequency and inter-RAT measurements on the unlicensed spectrum. $S_{CO}$ is configured in system information and/or a dedicated RRC message. For example, $S_{CO}$ can be contained in the information relevant for inter-frequency cell re-selection or idle mode mobility control.

In further embodiments, these rules may dictate that a UE may choose not to perform measurements of inter-frequencies or inter-RAT frequency cells with equal or lower priority when it detects a serving cell (e.g., BS) that fulfils the following relationship: Srxlev>$S_{nonIntraSearchP}$ and Squal>$S_{nonIntraSearchQ}$ and Srssi<$S_R$. Otherwise, the UE may perform measurements of inter-frequencies or inter-RAT frequency cells with equal or lower priority.

In further embodiments, these rules may dictate that a UE may choose not to perform measurements of inter-frequencies or inter-RAT frequency cells with equal or lower priority when it detects a serving cell (e.g., BS) that fulfils the following relationship: Srxlev>$S_{nonIntraSearchP}$ and Squal>$S_{nonIntraSearchQ}$ and $S_{channelOccupancy}$<$S_{CO}$. Otherwise, the UE may perform measurements of inter-frequencies or inter-RAT frequency cells with equal or lower priority.

In further embodiments, these rules may dictate that a UE may choose not to perform measurements of inter-frequencies or inter-RAT frequency cells with equal or lower priority when it detects a serving cell (e.g., BS) that fulfils the following relationship: $Srxlev > S_{nonIntraSearchP}$ and $Srssi < S_R$ and $S_{channelOccupancy} < S_{CO}$. Otherwise, the UE may perform measurements of inter-frequencies or inter-RAT frequency cells with equal or lower priority.

In further embodiments, these rules may dictate that a UE may choose not to perform measurements of inter-frequencies or inter-RAT frequency cells with equal or lower priority when it detects a serving cell (e.g., BS) that fulfils the following relationship: $Srxlev > S_{nonIntraSearchP}$ and $Srssi < S_R$. Otherwise, the UE may perform measurements of inter-frequencies or inter-RAT frequency cells with equal or lower priority.

In further embodiments, these rules may dictate that a UE may choose not to perform measurements of inter-frequencies or inter-RAT frequency cells with equal or lower priority when it detects a serving cell (e.g., BS) that fulfils the following relationship: $Srxlev > S_{nonIntraSearchP}$ and $S_{channelOccupancy} < S_{CO}$. Otherwise, the UE may perform measurements of inter-frequencies or inter-RAT frequency cells with equal or lower priority.

In further embodiments, these rules may dictate that a UE may choose not to perform measurements of inter-frequencies or inter-RAT frequency cells with equal or lower priority when it detects a serving cell (e.g., BS) that fulfils the following relationship: $Srssi < S_R$ and $S_{channelOccupancy} < S_{CO}$. Otherwise, the UE may perform measurements of inter-frequencies or inter-RAT frequency cells on the unlicensed spectrum with equal or lower priority.

In some embodiments, a UE may prioritize communications within the licensed spectrum higher than communications in the unlicensed spectrum, and perform inter-frequency measurements within each respective spectrum. This rule may be included within system information.

In a fourth exemplary embodiment, base station suitability assessments may take inter-frequency cell reselection criteria into consideration. For example, after a UE produces measurement results for inter-frequency and intra-frequency communications, the UE may evaluate a neighboring cell to determine whether the neighboring cell can be the a candidate cell for further base station suitability assessment. In performance of the base station suitability assessment, the RSRQ and/or RSRP of the neighboring cell may be assessed. Additionally, considerations of load and stability may also be considered in performance of the base station suitability assessment of the neighboring cells.

In some embodiments, as part of inter-frequency or inter-RAT cell reselection criteria on a unlicensed spectrum or on licensed spectrum, cell reselection to a cell on a higher priority frequency than the serving frequency is performed if the cell on the higher priority RAT/frequency fulfils a particular reselection condition. In certain embodiments, the re-selection condition is satisfied when: $Squal > Thresh_{x,HighQ}$ and $Srssi < Thresh_{x,HighR}$ and $S_{channelOccupancy} < Thresh_{x,HighCO}$ during a time interval. $Thresh_{x,HighQ}$ specifies the Squal threshold (in dB) used by the UE when reselecting towards a higher priority RAT/frequency cell than the current serving frequency cell. Also, $Thresh_{x,HighR}$ specifies the RSSI threshold in the frequency used by the UE when reselecting towards a higher priority RAT/frequency cell than the current serving frequency cell. $Thresh_{x,HighR}$ may be configured in system information and/or a dedicated RRC message. For example, $Thresh_{x,HighR}$ can be contained in the information relevant for inter-frequency cell re-selection or idle mode mobility control. Furthermore, $Thresh_{x,HighCO}$ specifies the channel occupancy threshold in the frequency used by the UE when reselecting towards a higher priority RAT/frequency than the current serving frequency. $Thresh_{x,HighCO}$ can be configured in system information and/or a dedicated RRC message. For example, $Thresh_{x,HighCO}$ can be contained in the information relevant for inter-frequency cell re-selection or idle mode mobility control.

In certain embodiments, the re-selection condition is satisfied when a cell of a higher priority RAT/frequency fulfils $Squal > Thresh_{X,HighQ}$ and $S_{channelOccupancy} < Thresh_{x,HighCO}$ during a time interval.

In certain embodiments, the re-selection condition is satisfied when a cell of a higher priority RAT/frequency fulfils $Squal > Thresh_{X,HighQ}$ and $Srssi < Thresh_{x,HighR}$ during a time interval.

In certain embodiments, the re-selection condition is satisfied when a cell of a higher priority RAT/frequency fulfils $Srxlev > Thresh_{X,HighP}$ and $Srssi < Thresh_{x,HighR}$ and $S_{channelOccupancy} < Thresh_{x,HighCO}$ during a time interval. $Thresh_{X,HighP}$ specifies the Srxlev threshold (in dB) used by the UE when reselecting towards a higher priority RAT/frequency cell than the current serving frequency cell.

In certain embodiments, the re-selection condition is satisfied when a cell of a higher priority RAT/frequency fulfils $Srxlev > Thresh_{X,HighP}$ and $S_{channelOccupancy} < Thresh_{x,HighCO}$ during a time interval In certain embodiments, the re-selection condition is satisfied when a cell of a higher priority RAT/frequency fulfils $Srxlev > Thresh_{X,HighP}$ and $Srssi < Thresh_{x,HighR}$ during a time interval.

In certain embodiments, the re-selection condition is satisfied when a cell of a higher priority RAT/frequency fulfils $Squal > Thresh_{X,HighQ}$ and $Srxlev > Thresh_{X,HighP}$ and $S_{channelOccupancy} < Thresh_{x,HighCO}$ and $Srssi < Thresh_{x,HighR}$ during a time interval.

In some embodiments, for inter-frequency cell reselection on a licensed spectrum, cell reselection to a cell on a higher priority frequency than the serving frequency shall be performed if a licensed spectrum reselection criteria is satisfied. In certain embodiments, the licensed spectrum reselection criteria is satisfied when a cell of a higher priority frequency fulfils $Squal > Thresh_{X,HighQ}$ during a time interval. In further embodiments, the licensed spectrum reselection criteria is satisfied when a cell of a higher priority frequency fulfils $Srxlev > Thresh_{X,HighP}$ during a time interval.

In some embodiments, for inter-frequency or inter-RAT cell reselection criteria on an unlicensed spectrum or on a licensed spectrum, cell reselection to a cell on a lower priority frequency than the serving frequency is performed when a lower priority reselection criteria is satisfied. In certain embodiments, the lower priority reselection criteria may be satisfied when a serving cell fulfils $Squal < Thresh_{Serving,LowQ}$ and $Srssi > Thresh_{Serving,R}$ and $S_{channelOccupancy} > Thresh_{Serving,CO}$ and a cell of a lower priority frequency fulfils $Squal > Thresh_{X,LowQ}$ and $Srssi < Thresh_{x,LowR}$ and $S_{channelOccupancy} < Thresh_{X,LowCO}$ during a time interval. $Thresh_{Serving,LowQ}$ specifies the Squal threshold (in dB) used by the UE on the serving cell when reselecting towards a lower priority RAT/frequency. $Thresh_{X,LowQ}$ specifies the Squal threshold (in dB) used by the UE when reselecting towards a lower priority RAT/frequency than the current serving frequency. $Thresh_{Serving,R}$ specifies the RSSI threshold of current serving frequency. $Thresh_{Serving,R}$ may be configured in system information and/or a dedicated RRC message. For example, $\text{Thresh}_{Serving,R}$ can be contained in the information relevant for inter-frequency cell re-selection or idle mode mobility control. $\text{Thresh}_{Serving,CO}$ specifies the channel occupancy threshold of a current serving frequency. $\text{Thresh}_{Serving,CO}$ may be configured in system information and/or a dedicated RRC message. For example, $\text{Thresh}_{Serving,CO}$ can be contained in the information relevant for inter-frequency cell re-selection or idle mode mobility control. $\text{Thresh}_{X,LowR}$ specifies the RSSI threshold used by the UE when reselecting towards a lower priority RAT/frequency than the current serving frequency. $\text{Thresh}_{X,LowR}$ may be configured in system information and/or a dedicated RRC message. For example, $\text{Thresh}_{X,LowR}$ can be contained in the information relevant for inter-frequency cell re-selection or idle mode mobility control. $\text{Thresh}_{X,LowCO}$ specifies the channel occupancy threshold used by the UE when reselecting towards a lower priority RAT/frequency than the current serving frequency. $\text{Thresh}_{X,LowCO \ may \ be}$ is configured in system information and/or a dedicated RRC message. For example, $\text{Thresh}_{X,LowCO}$ can be contained in the information relevant for inter-frequency cell re-selection or idle mode mobility control.

In certain embodiments, the lower priority reselection criteria may be satisfied when a serving cell fulfils $\text{Squal}<\text{Thresh}_{Serving,LowQ}$ and $\text{Srssi}>\text{Thresh}_{Serving,R}$ and a cell of a lower priority frequency fulfils $\text{Squal}>\text{Thresh}_{X,LowQ}$ and $\text{Srssi}<\text{Thresh}_{X,LowR}$ during a time interval.

In certain embodiments, the lower priority reselection criteria may be satisfied when a serving cell fulfils $\text{Squal}<\text{Thresh}_{Serving,LowQ}$ and $S_{channelOccupancy}>\text{Thresh}_{Serving,CO}$ and a cell of a lower priority frequency fulfils $\text{Squal}>\text{Thresh}_{X,LowQ}$ and $S_{channelOccupancy}<\text{Thresh}_{X,LowCO}$ during a time interval.

In certain embodiments, the lower priority reselection criteria may be satisfied when a serving cell fulfils $\text{Srxlev}<\text{Thresh}_{Serving,LowP}$ and $\text{Srssi}>\text{Thresh}_{Serving,R}$ and $S_{channelOccupancy}>\text{Thresh}_{Serving,CO}$ and a cell of a lower priority frequency fulfils $\text{Srxlev}>\text{Thresh}_{X,LowP}$ and $\text{Srssi}<\text{Thresh}_{X,LowR}$ and $S_{channelOccupancy}<\text{Thresh}_{X,LowCO}$ during a time interval. $\text{Thresh}_{X,LowP}$ specifies the Srxlev threshold (in dB) used by the UE when reselecting towards a lower priority RAT/frequency than the current serving frequency.

In some embodiments, for inter-frequency or inter-RAT cell reselection criteria on a licensed spectrum, cell reselection to a cell on a lower priority frequency than the serving frequency is performed when a serving cell fulfils the following conditions: $\text{Squal}<\text{Thresh}_{Serving,LowQ}$ and a cell of a lower priority frequency fulfils $\text{Squal}>\text{Thresh}_{X,LowQ}$ during a time interval.

In some embodiments, for inter-frequency or inter-RAT cell reselection criteria on licensed spectrum, cell reselection is performed: when the serving cell fulfils $\text{Srxlev}<\text{Thresh}_{Serving, \ LowP}$ and a cell of a lower priority frequency fulfils $\text{Srxlev}>\text{Thresh}_{X,LowP}$ during a time interval.

In a fifth exemplary embodiment, base station suitability assessments may take intra-frequency and equal priority inter-frequency cell reselection criteria into consideration. For example, a UE may rank neighboring intra-frequency and inter-frequency cells, and select the cell of highest rank. Accordingly, compared to assessments at the licensed spectrum, load and stability may be considered in assessments of the unlicensed spectrum.

In some embodiments, a cell-ranking or BS ranking criterion $R_s$ for a serving cell and $R_n$ for neighboring cells on an unlicensed spectrum is defined as: $R_s=Q_{meas,s}+Q_{Hyst}-\text{Qoffset}_{temp}-\text{Qoffset}_{unlicensed1}$ and $R_n=Q_{meas,n}-Q_{offset}-\text{Qoffset}_{temp}-\text{Qoffset}_{unlicensed2}$. $Q_{meas,s}$ is a RSRP measurement quantity used in cell reselections. $Q_{Hyst}$ is the hysteresis value for a ranking criteria. Also, $\text{Qoffset}_{unlicensed1}$ is a offset applied to a cell in the unlicensed spectrum and $\text{Qoffset}_{unlicensed2}$ is another offset applied to a cell in the unlicensed spectrum. $\text{Qoffset}_{unlicensed1}$ and $\text{Qoffset}_{unlincensed2}$ can be different in certain embodiments, but may be the same in other embodiments. BSes or nodes can raise or reduce the cell selection threshold according to successful preemption probability of an associated load. This operation of the BSes or nodes may be configured in system information and/or a dedicated RRC message. For example, instructions for the operation of the BSes or nodes can be contained in the information relevant for inter-frequency or intra-frequency cell re-selection or idle mode mobility control.

In some embodiments, a cell-ranking criterion $R_s$ for a serving cell and $R_n$ for neighboring cells on a licensed spectrum is defined as: $R_s=Q_{meas,s}+Q_{Hyst}-\text{Qoffset}_{temp}-\text{Qoffset}_{unlicensed}$ and $R_n=Q_{meas,n}-Q_{offset}-\text{Qoffset}_{temp}$. $\text{Qoffset}_{unlicensed}$ is a offset applied to a cell in the unlicensed spectrum. BSes or nodes can raise or reduce the cell selection threshold according to a successful preemption probability of a load. This operation of BSes or nodes may be configured in system information and/or a dedicated RRC message. For example, instructions for the operation of BSes or nodes can be contained in the information relevant for inter-frequency or intra-frequency cell re-selection or idle mode mobility control.

In a sixth exemplary embodiment, base station suitability assessments may take LBT failures into consideration to decrease a priority of cell reselection. In certain embodiments, a UE may not complete a RACH and RRC connection setup procedure due to a LBT failure after the UE selects a cell. This may be caused by, for example, wrong parameters for cell selection, or improper configurations of radio resources, or a sudden disturbance. Accordingly, a UE may decrease a reselection priority of the cell for which LBT failures have occurred for the UE.

In some embodiments, a LBT failure may be messaged within the various components of a UE. For example, a physical layer of a UE can indicate to higher layers of the UE (e.g., a UE's medium access control (MAC)) that a transmission was not performed due to a LBT failure. A LBT failure can be detected as, for example, the transmission number of physical random access channel (PRACH) preambles reaching a maximum number or a transmission number of msg3 (e.g., the standard third message of a random access procedure) reaching a maximum number. In certain embodiments, when a LBT failure is detected, the LBT failure may be messaged by the UE's MAC to the UE's RRC.

The UE can use the $\text{Qoffset}_{unlicensed}$ parameter during a time interval $T_{offset}$ (e.g., a predetermined time interval) when an LBT failure is detected. $T_{offset}$ specifies the time that $\text{Qoffset}_{unlicensed}$ applies to a cell in the unlicensed spectrum. $T_{offset}$ may be configured in system information and/or in a dedicated RRC message. For example, $T_{offset}$ can be contained in the information relevant for intra/inter-frequency cell re-selection or idle mode mobility control.

In some embodiments, a UE may use the $\text{Qoffset}_{unlicensed}$ during a time interval $T_{offset}$ if the UE measures the RSSI and channel occupancy of a frequency to find that $Q_{rssimeas} \geq Q_{rssi\_max}$ and/or $Q_{channdOccupancymeass} \geq Q_{channelOccupancy\_max}$. $Q_{channelOccupancymeas}$ is a measured channel occupancy rate $Q_{rssi\_max}$ specifies the RSSI maximum threshold in the unlicensed spectrum. $Q_{rssi\_max}$ may be configured in system information and/or a dedicated RRC message. For example, $Q_{rssi\_max}$ can be contained in the information relevant for intra/inter-frequency cell re-selection or idle mode mobility control. $Q_{channelOccupancy\_max}$ specifies the channel occupancy maximum threshold in the unlicensed spectrum. $Q_{channelOccupancy\_max}$ is configured in system information and/or a dedicated RRC message. For example, $Q_{channelOccupancy\_max}$ can be contained in the information relevant for intra/inter-frequency cell re-selection or idle mode mobility control.

In some embodiments, if a UE measures the RSSI and channel occupancy of a frequency, and $Q_{rssimeas} \geq Q_{rssi\_max}$ and/or $Q_{channelOccupancymeass} \geq Q_{channelOccupancy\_max}$, then the UE treats this measured frequency as a barred frequency during a time interval $T_{barred}$. Also, the cell at this frequency may be deemed as a barred cell during a time interval $T_{barred}$. $T_{barred}$ specifies the time that the frequency is barred in the unlicensed spectrum. $T_{barred}$ is may be configured in system information and/or a dedicated RRC message. For example, $T_{barred}$ can be contained in the information relevant for intra/inter-frequency cell re-selection or idle mode mobility control.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a communication device, the method comprising:
   receiving reference signals, wherein the reference signals are from a licensed spectrum or an unlicensed spectrum;
   determining a parameter value according to a received signal strength indicator (RSSI) and a channel occupancy of the received reference signals; and
   selecting, in response to the parameter value meeting a condition, a communication node based at least on the ranking of the communication node, wherein the communication node is ranked when a cell selection channel occupancy rate associated with the communication node is below a first threshold value.

2. The method of claim 1, wherein the communication node is associated with either the licensed spectrum or the unlicensed spectrum.

3. The method of claim 1, further comprising:
   selecting the communication node based on the ranking of at least one of:
   intra-frequency communications,
   inter-frequency communications, and
   inter-radio access technologies (RAT) communications.

4. The method of claim 3, further comprising:
   ranking the communication node when a cell selection received signal strength indicator associated with the communication node is below a second threshold value.

5. The method of claim 4, wherein the cell selection received signal strength indicator is associated with a measured signal strength indication and a maximum signal strength indication.

6. The method of claim 4, wherein the second threshold value is associated with a received signal strength indicator (RSSI) threshold for inter-frequency and inter-radio access technologies (RAT) measurements.

7. The method of claim 4, wherein the second threshold value is associated with a received signal strength indicator (RSSI) threshold for inter-frequency evaluation of a neighboring cell.

8. The method of claim 1, wherein the cell selection channel occupancy rate is associated with a measured channel occupancy rate and a maximum channel occupancy rate.

9. The method of claim 1, wherein the first threshold value is associated with a channel occupancy rate threshold for inter-frequency and inter-radio access technologies (RAT) measurements.

10. The method of claim 1, wherein the first threshold value is associated with a channel occupancy rate threshold for inter-frequency evaluation of a neighboring cell.

11. The method of claim 3, further comprising:
    ranking the communication node based on an applied offset.

12. The method of claim 11, wherein the applied offset is applied during a time interval.

13. The method of claim 11, wherein the applied offset is applied when a transmission number of physical random access channel (PRACH) preambles reaches a third threshold value.

14. The method of claim 11, wherein the applied offset is applied when a transmission number of msg3 reaches a fourth threshold value.

15. A communication device comprising:
    a receiver configured to:
      receive reference signals from a licensed spectrum or an unlicensed spectrum;
    at least one processor configured to:
      determine a parameter value according to a received signal strength indicator (RSSI) and a channel occupancy of the received reference signals; and
    a transmitter configured to:
      select, in response to the parameter value meeting a condition, a communication node based at least on the ranking of the communication node, wherein the communication node is ranked when a cell selection channel occupancy rate associated with the communication node is above a first threshold value.

16. The communication device of claim 15, wherein the transmitter is further configured to:
    rank the communication node when a cell selection received signal strength indicator associated with the communication node is above a second threshold value.

17. The communication device of claim 15, wherein a cell selection offset is associated at least one of:
    an inter-frequency measurement;
    an inter-radio access technology (RAT) measurement; and
    a cell ranking.

18. A non-transitory computer readable medium having instructions stored thereon, wherein the instructions, when executed by a processor, cause a device to perform operations comprising:
    receiving reference signals, wherein the reference signals are from a licensed spectrum or an unlicensed spectrum;
    determining a parameter value according to a received signal strength indicator (RSSI) and a channel occupancy of the received reference signals; and
    selecting, in response to the parameter value meeting a condition, a communication node based at least on the ranking of the communication node, wherein the communication node is ranked when a cell selection channel occupancy rate associated with the communication node is below a first threshold value or above a second threshold value.

* * * * *